US012787928B2

(12) United States Patent
Sidapara et al.

(10) Patent No.: US 12,787,928 B2
(45) Date of Patent: Nov. 10, 2026

(54) SYSTEMS AND METHODS FOR ADJUSTING HARVESTER CUTTER HEIGHTS

(71) Applicant: Deere & Company, Moline, IL (US)

(72) Inventors: Sahil M. Sidapara, Hadapsar (IN); Kedarnath Rugge, Hadapsar (IN); Saket K. Patne, Hadapsar (IN)

( * ) Notice: Subject to any disclaimer, the term of this patent is extended or adjusted under 35 U.S.C. 154(b) by 121 days.

(21) Appl. No.: 19/060,486

(22) Filed: Feb. 21, 2025

(65) Prior Publication Data

US 2026/0248067 A1 Aug. 27, 2026

(51) Int. Cl.
*A01D 41/127* (2006.01)
*A01D 41/14* (2006.01)
*A01D 45/10* (2006.01)

(52) U.S. Cl.
CPC ......... *A01D 41/127* (2013.01); *A01D 41/141* (2013.01)

(58) Field of Classification Search
CPC .... A01D 41/127; A01D 41/141; A01D 45/10; A01D 45/021; A01D 34/006; A01B 69/008
See application file for complete search history.

(56) References Cited

U.S. PATENT DOCUMENTS

| | | | | |
|---|---|---|---|---|
| 6,389,785 B1 * | 5/2002 | Diekhans | A01B 69/008 172/4.5 |
| 2023/0189710 A1 * | 6/2023 | Anderson | A01D 43/085 56/10.2 A |
| 2023/0270043 A1 * | 8/2023 | Dugas | A01D 34/006 56/10.2 E |

* cited by examiner

*Primary Examiner* — Robert E Pezzuto
(74) *Attorney, Agent, or Firm* — Taft Stettinius & Hollister LLP; Stephen F. Rost

(57) ABSTRACT

A system having a plurality of perception sensors coupled to an agricultural vehicle that capture information regarding crop material in a row of crop material that is laterally offset from, and rearward of, the agricultural vehicle. Moreover, the perception system can capture information regarding the crop material in a row of crop material that is different than a row of crop material the agricultural vehicle is currently harvesting. Location information from a location can be used to identify a crop location for different portions of the crop material represented in the captured information. Information from a perception system can assist in identifying various cutting locations along the row of crop material that is not currently being harvested. Such cutting locations can assist the system in predetermining cutting height settings for one or more cutter assemblies of the agricultural vehicle in a location dependent manner along the row of crop material.

20 Claims, 7 Drawing Sheets

SYSTEMS AND METHODS FOR ADJUSTING HARVESTER CUTTER HEIGHTS

FIELD OF THE DISCLOSURE

The present disclosure generally relates to harvesting a crop material, and, more specifically, to systems and methods for determining and proactively adjusting cutting height settings for one or more cutter assemblies of an agricultural vehicle using localization and mapping.

BACKGROUND

Stalk-like crops, including, for example, sugarcane, among others, can be harvested using agricultural vehicles, such as sugarcane harvesters, that can sever crop material from the ground. Additionally, such agricultural vehicles can cut leaves that can be present on the crop material, including leaves that can be around or above a top portion of the stalk of the crop. The severed crop, and, at least in certain situations, the cut leaves, can then be ingested by the agricultural vehicle, or another agricultural vehicle or tool, and be subjected together to further processing, such as, for example, threshing, separation, and cleaning operations, among other operations.

SUMMARY

The present disclosure can comprise one or more of the following features and combinations thereof.

In one embodiment of the present disclosure, a system is provided for an agricultural vehicle. The system can include a cutter assembly, and a plurality of perception sensors coupled to the agricultural vehicle. The plurality of perception sensors can be positioned to capture, as the agricultural vehicle travels while harvesting a first crop material in a first row of a crop material, an information representing a second crop material when the second crop material is located rearward of the agricultural vehicle. Additionally, the second crop material can be located in a second row of crop material that is laterally offset from the first row of crop material. The system can also include a location system that can be configured to provide location information, at least one processor, and a memory device coupled to the at least one processor. The memory device can include instructions that when executed by the at least one processor cause the at least one processor to determine, using information from the location system, a crop location for each of a plurality of portions of the second crop material represented in the information captured by the plurality of perception sensors, and determine, using the information captured by the plurality of perception sensors, and for each of the plurality of portions of the second crop material, a predetermined cutting height at the crop location. Additionally, the memory device can include instructions that when executed by the at least one processor cause the at least one processor to generate, for each of the plurality of portions of the second crop material, a signal to adjust a current cutting height setting of the cutter assembly to the predetermined cutting height setting in response to (1) a detection of a location of the agricultural vehicle relative to the crop location, and (2) an identified difference between the current cutting height setting of the cutter assembly and the predetermined cutting height setting.

In one embodiment of the present disclosure, a method is provided for harvesting a crop material in a field by an agricultural vehicle. The method can include determining, using a captured information obtained using a plurality of perception sensors, a crop location for a plurality of portions of a second crop material in a second row of crop material while the agricultural vehicle harvests a first crop material in a first row of crop material, the captured information representing, when captured, one or more portions of the second crop material located laterally offset from, and rearward of, the agricultural vehicle. Additionally, the method can include determining, for each of the plurality of portions of the second crop material, and using information captured by the plurality of perception sensors, a predetermined cutting height setting for a cutter assembly of the agricultural vehicle at the crop location. Further, for each of the plurality of portions of the second crop material, a signal can be generated to adjust a current cutting height setting of a cutter assembly of the agricultural vehicle to the predetermined cutting height setting in response to (1) a detection of a location of the agricultural vehicle relative to the crop location, and (2) an identified difference between the current cutting height setting of the cutter assembly and the predetermined cutting height setting.

These and other features of the present disclosure will become more apparent from the following description of the illustrative embodiments.

BRIEF DESCRIPTION OF THE DRAWINGS

The disclosure contained herein is illustrated by way of example and not by way of limitation in the accompanying figures. For simplicity and clarity of illustration, elements illustrated in the figures are not necessarily drawn to scale. For example, the dimensions of some elements can be exaggerated relative to other elements for clarity. Further, where considered appropriate, reference labels have been repeated among the figures to indicate corresponding or analogous elements.

Corresponding reference numerals are used to indicate corresponding parts throughout the several views.

DETAILED DESCRIPTION

Figure 1:
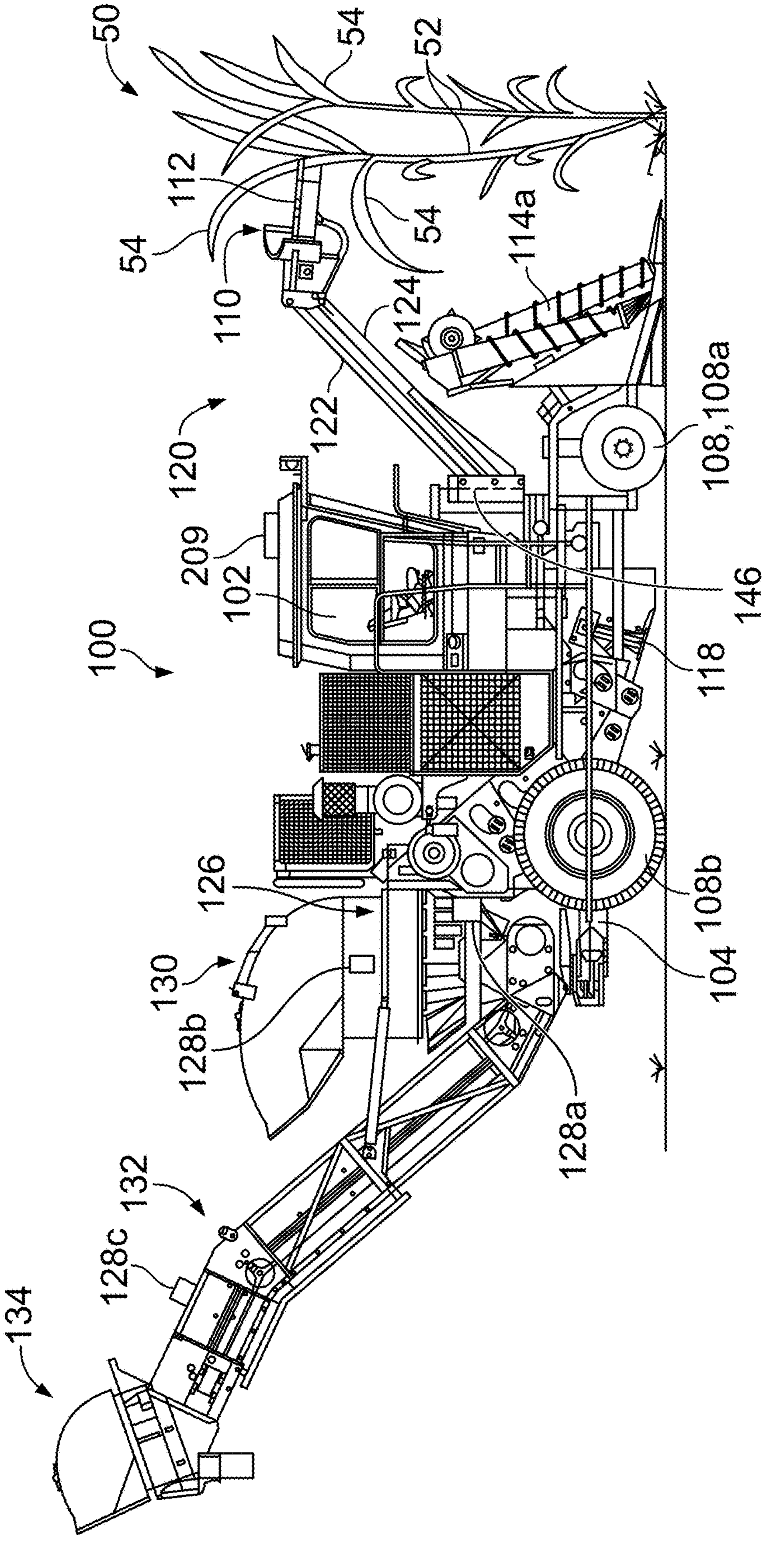
FIG. 1 illustrates a right-side elevational view of an exemplary agricultural vehicle in the form of a sugarcane harvester.

While the concepts of the present disclosure are susceptible to various modifications and alternative forms, specific embodiments thereof are shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described can include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In certain circumstances, when harvesting crop material, the size of an agricultural vehicle and/or a location of a particular cutter assembly of the agricultural vehicle can prevent an operator of the agricultural vehicle from visually observing certain cutter assembly settings, including cutting heights. Consequently, from the operator's viewpoint, it can be challenging to clearly determine the appropriate cutting height settings for certain cutter assemblies for cutting crop material, let alone make determinations regarding adjustments to those height settings in response to variations in the characteristics of the crop material and/or terrain.

Embodiments of the subject application relate to a system utilized with agricultural vehicles in connection with sequential row harvesting. The system can include a plurality of perception sensors that are positioned to capture information of crop material in one or more rows of crop materials in a field other than the row(s) in which the agricultural vehicle is currently traveling through and/or harvesting crop materials. For example, the plurality of perception sensors can be positioned on the agricultural vehicle at locations at which the perception sensors capture information pertaining to crop materials in a row(s) to a side of the agricultural vehicle, and in which the agricultural vehicle will be traveling during the next, or a subsequent, pass through the field during the same harvesting operation. Additionally, the perception sensors can capture information of crop material in the other row(s) at a location in which that crop material is, in addition to be offset to a side of the agricultural vehicle, also behind, or rearward of, the agricultural vehicle. Moreover, the perception sensors capture information pertaining to crop material that is to a rearward side of the agricultural vehicle.

The information captured by the perception sensors can be analyzed to provide insights into settings for the agricultural vehicle, including cut heights for one or more cutter assemblies of the agricultural vehicle, for the next, or subsequent, pass through the field during the same harvesting operation. Such an approach can provide time to analyze information captured by the perception sensors so as to at least enable a determination of a cutting height setting for the one or more cutter assemblies, thereby reducing reliance on real-time front-end monitoring sensors or cameras that can encounter visibility challenges due to dense crops.

According to certain embodiments, the system can utilize simultaneous localization and mapping (SLAM) for at least row-by-row map generation, including generating, as the agricultural vehicle travels through the field, detailed three-dimensional maps of rows of crop materials in the field. Such maps can provide relatively accurate real-time information of the agricultural environment, including, for example, with respect to the topography, crop height, crop density, and ground conditions for the subsequent rows of crop materials that the agricultural vehicle is to harvest. This capability can facilitate proactive transitions in settings, including with respect to cutting heights of one or more cutter assemblies, between rows of the field without requiring halts or recalibrating machinery. Consequently, harvesting speed and efficiency can be increased while maintaining precision in the cutting process. Such an automated approach can also minimize operator input, which can promote generally consistent results and facilitate an efficient, error-reduced harvesting process. Such an approach to three-dimensional mapping of the field can also enhance visualization, allowing precise control over the harvesting procedure, reducing crop waste, and avoiding machine damage by maintaining optimal cutting heights.

The system can also integrate sensor fusion that can involve, for example, a combination of location systems (e.g., global positioning systems (GPS)), inertial measurement units (IMUs), and the perception sensors with SLAM. Such an approach can enhance operational efficiency by enabling the adjustment of cutting height settings for one or more cutter assemblies, including, for example, topper and/or base cutter assemblies, via an automated feedback system. In determining cutting height settings, the system can further consider localized captured information pertaining to the density of the crop material, as well as employ computer perception, including vision techniques, to detect, for at least certain types of crops, a separation or transition location(s) between the stalks and leaves of the crop materials.

According to certain embodiments, during an initial pass of the agricultural vehicle through a first row(s) of crop material, the perception sensors can collect information regarding one or more second, adjacent rows of crop materials in the field that are to the side of the first row(s) and/or of the agricultural vehicle. Additionally, the portion of crop material in the one or more second rows being captured by the perception sensors can, in addition to being laterally offset to the side of the agricultural vehicle, be generally behind, or rearward of, the agricultural vehicle. One or more controllers of the agricultural vehicle, including one or more associated processors, can evaluate and transform the captured information regarding the crop material in the second row(s). Such transformation can pertain to, for example, determinations relating to crop density, height, and/or cutting points for the crop materials, as well as identify the corresponding location information, such as, for example, GPS coordinates, for that derived information. Such information can be utilized to establish the height at which crop material in the second row(s) is to be cut, as well as determine, and, if needed, adjust, cutting height settings for one or more cutter assemblies for cutting the crop material in the second row(s). Additionally, such a process can be iterated for each subsequent row(s) in the field.

Figure 2:
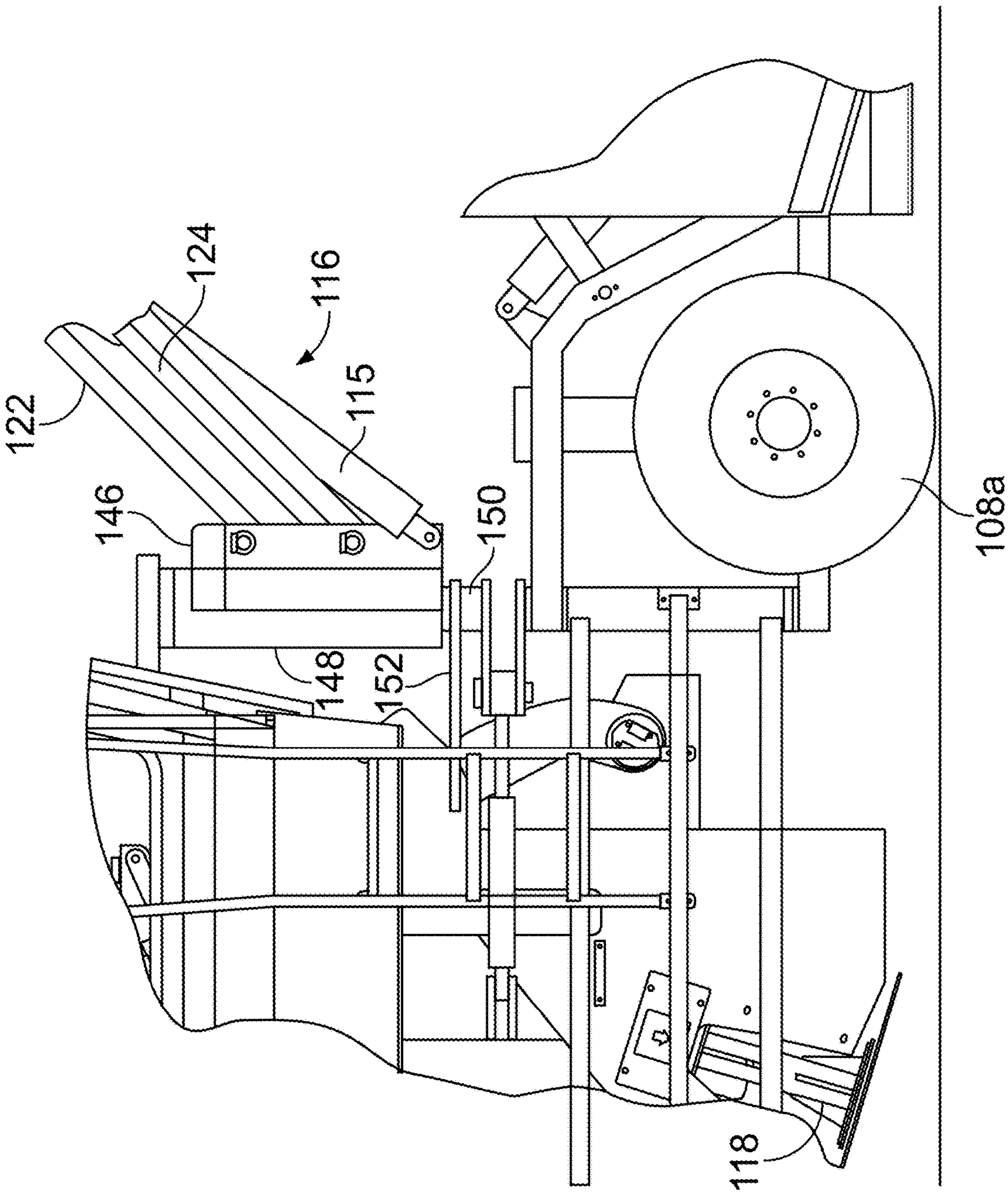
FIG. 2 illustrates a fragmentary right-side elevational view of exemplary connections between the main frame and a topper assembly of the agricultural vehicle shown in FIG. 1.

FIGS. 1 and 2 illustrate an exemplary agricultural vehicle 100 for harvesting at least one type of crop material. Moreover, FIG. 1 illustrates an exemplary agricultural vehicle 100 in the form of a type of sugarcane harvester configured for harvesting sugarcane. While FIG. 1 illustrates one type of harvester for the agricultural vehicle 100, other harvesters can be utilized in place of the illustrated sugarcane harvester, including, for example, harvesters or combines utilized to harvest other types of crop material. Additionally, while the agricultural vehicle 100 is discussed below in connection with a particular type of conveyance assembly for transporting the harvested crop material about the agricultural vehicle 100, other types of conveyance assemblies can be utilized, including, for example, conveyance assemblies associated with other types of crop materials.

The illustrated agricultural vehicle 100 can include a cab 102 to seat an operator, as well as a main frame 104 for supporting various cutting, routing, and processing devices. In certain embodiments, the main frame 104 can be supported by a transport frame, such as track frame, that can support ground engagement bodies 108, such as, for example, track assemblies or front or rear wheels 108*a*, 108*b*, that contact, and are utilized in the propulsion of the agricultural vehicle 100 along, a ground surface. Thus, the agricultural vehicle 100 can include an engine (not visible) that can provide power for driving at least the ground engagement bodies 108, 108*b*, among other driven components of the agricultural vehicle 100.

The illustrated agricultural vehicle 100 can include crop dividers 114 that can be coupled to the main frame 104. The crop dividers 114 can be configured to divide the crop material being harvested using the agricultural vehicle 100 into separate rows so as to at least attempt to prevent uprooting of the crop material. The height of the crop dividers 114 relative to at least the adjacent ground surface or main frame 104 of the agricultural vehicle 100 can be selectively adjusted by an operator of the agricultural vehicle 100, such as, for example, via operation of one or more actuators. Additionally, according to certain embodiments, such height adjustment of the crop dividers 114 can be independent of an adjustment to the height, if any, of the overall agricultural vehicle 100, a topper assembly 110, and/or independent of one or more other crop dividers 114.

A knockdown roller (not shown) of the agricultural vehicle 100 can be configured to push the crop material being harvested from the field in a generally forward direction so that base cutters 118 of the agricultural vehicle 100 can at least attempt to cut the crop material in the field at, or around, ground level. According to certain embodiments, the base cutters 118, which can be coupled to the main frame 104, can be configured to cut the crop material in a substantially horizontal plane. The base cutters 118 can comprise a plurality of base cutters 118, such as, for example, one or more right and left side base cutters 118. Moreover, while certain types of agricultural vehicles 100 in the form of sugarcane harvesters can have a single pair of base cutters 118 (e.g., a right side base cutter and a left side base cutter), the agricultural vehicle 100 can have more than one pair of base cutters 118, and can instead have a plurality of pairs of base cutters 118. The agricultural vehicle 100 can also include side knives that can be configured to cut crop material in a vertical plane substantially parallel with a travel path of the agricultural vehicle 100.

Figure 4:
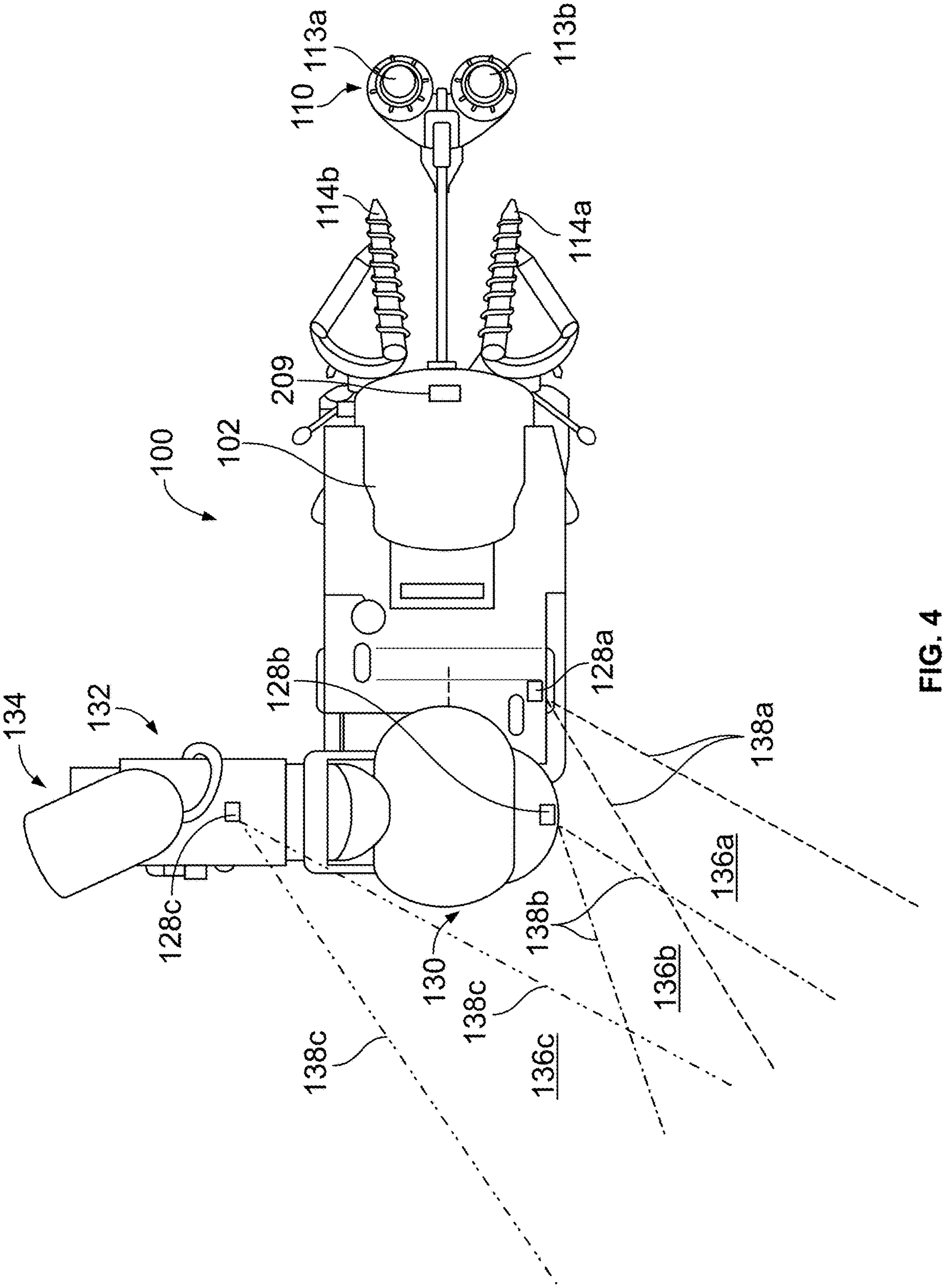
FIG. 4 illustrates a schematic top view of the agricultural vehicle shown in FIG. 1 having a plurality of rearwardly directed perception sensors.

The illustrated exemplary agricultural vehicle 100 can include a topper assembly 110 that extends forward of the main frame 104. The topper assembly 110 can be configured to cut leaves off of the top or upper areas of the crop material being harvested. As seen in FIG. 4, according to certain embodiments, the topper assembly 110 can include a cutting head 112 that can include one or more, if not a plurality, of cutting disks 113*a*, 113*b* that can be configured to cut the tops of the crop material being harvested, as well as to assist in discharging the cut portion of the crop material to an adjacent portion of the field in which crop material may have already been harvested. As discussed herein, a height of at least a portion of the topper assembly 110, such as, for example, the cutting head 112, including one or more, if not all, of the disks 113*a*, 113*b*, can be proactively adjusted. For example, as discussed below, a height at which the topper assembly 110 is to cut crop can be proactively adjusted to varying target cutting heights that can generally correspond to identified locations, including transitions, between a first portion of the crop, such as, for example, a stalk(s), and a second portion of the crop, such as, for example, leaves. Such adjustment of at least a portion of the topper assembly 110 can be independent of adjustments to the height of the agricultural vehicle 100 or other portions, including other systems or assemblies, of the agricultural vehicle 100.

Figure 3:
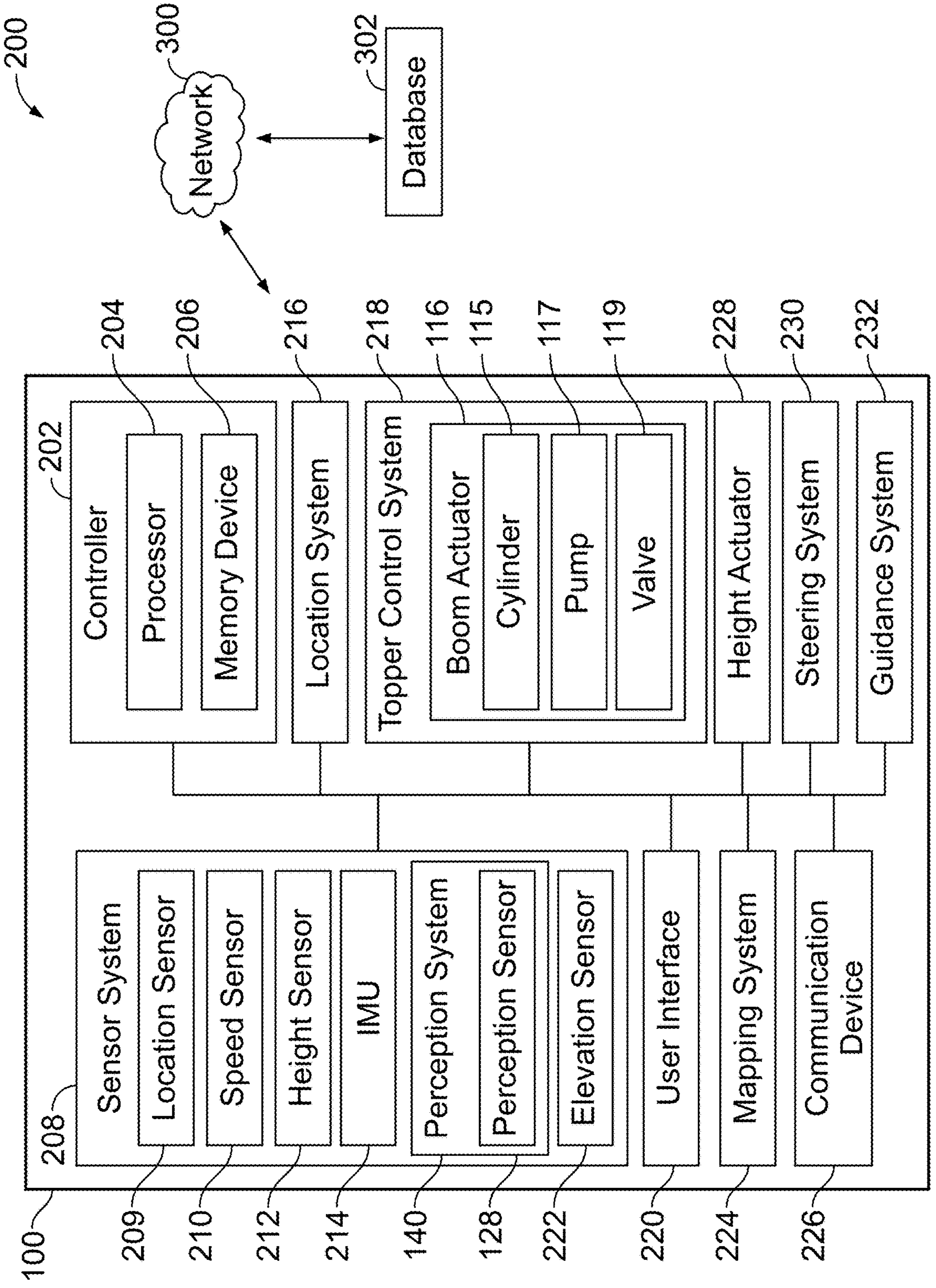
FIG. 3 illustrates a simplified block diagram of an exemplary system for determining a cutting height setting for one or more cutter assemblies of an agricultural vehicle.

The topper assembly 110 can include a gathering and cutting head 112 that can be coupled to the main frame 104 by a boom 120. According to the illustrated example, the boom 120, which can be part of a topper control system 218 (FIG. 3), can include an upper arm 122 and a lower parallel arm 124, respectively. For at least certain types of agricultural vehicle 100, the rear ends of the arms 122, 124 can be pivotally coupled to a swing frame 146. The swing frame 146 can include a tubular member 148 mounted for swinging of at least a portion of the swing frame 146, and thus the boom 120, about a vertical axis defined by a cylindrical support post 150 that is fixed to a central location of the main frame 104 just below a lower region of the cab 102. Additionally, the boom 120, including, for example, the lower arm 124, can be coupled to an extensible and retractable boom actuator 116 that can also be coupled to the swing frame 146 or main frame 104. The boom actuator 116, which can, for example, be a hydraulically or pneumatically actuated cylinder 115 (FIG. 3) that can be selectively actuated to control an operating height of the topper assembly 110, and, moreover, of the cutting head 112. Thus, as seen in FIG. 3, according to certain embodiments in which the boom actuator 116 includes a hydraulically or pneumatically actuated cylinder 115, the boom actuator 116 can, for example, be fluidly coupled to a pump 117 and one or more valves 119, among other components of an associated fluid circuit, that can be selectively actuated, such as, for example, by one or more signals from a controller 202. Such selective control of a flow of fluid to, or from, a chamber of the boom actuator 116, can be used to control a positioning of an associated cylinder rod of the cylinder 115. Such control of the positioning of the cylinder rod (e.g., retraction or extension of the cylinder rod relative to at least the chamber of the cylinder 115) can facilitate pivotal displacement of the boom 120 in a manner that can selectively alter a vertical height or position of the topper assembly 110, and thus the cutting head 112. However, the boom actuator 116 can take a variety of other forms, including, for example, including a motor or engine that can be used to control the height of the topper assembly 110, and, moreover, of the cutting head 112, in a variety of other manners, including via use of one or more linkages or cables that are coupled to the motor or engine, among other manners of control.

According to certain embodiments, the height of the base cutters 118 can be dependent on the height of the agricultural vehicle 100. Thus, for example, adjusting the height of one or more, if not all, of the base cutters 118 can involve operating one or more actuators 228 (FIG. 3) that can facilitate a change in height of at least a portion of the agricultural vehicle 100, such as, for example, the main frame 104, such that at least the vertical position of the base cutters 118 relative to the ground surface is adjusted (e.g., raised or lowered). Alternatively, or additionally, the vertical position of the base cutters 118 can be adjusted independent of changes in the height of the agricultural vehicle 100. For example, the height of the agricultural vehicle 100, including, for example, the height of the main frame 104 relative to the adjacent ground surface, can, for some agricultural vehicles 100, remain generally static as one or more actuators 228 are utilized to adjust the vertical height of one or more, if not all, of the base cutters 118. Further, according to certain embodiments, the height of the agricultural vehicle 100, such as, for example, the main frame 104, can be adjustable to accommodate generally larger, or coarse, adjustments of the height of the base cutters 118, and one or more actuators 228 can be utilized for adjusting the height of one or more base cutters 118 relative to the agricultural vehicle 100 and ground surface so as to accommodate finer adjustments in the height of the base cutters 118. Additionally, the height of at least some base cutters 118 can be selectively adjusted independent of changes, if any, to the height of at least another base cutter(s) 118, and vice versa.

During operation of the agricultural vehicle 100, as the agricultural vehicle 100 travels toward crop materials 50, the cutting head 112 of the topper assembly 110 can be positioned to sever at least an upper portion of a collection of upcoming crop material 50. For example, with respect to sugarcane, the topper assembly 110 can be positioned to at least attempt to cut the approaching crop at a location between the stalk 52 and the leaves 54 that are located above the stalk 52. Further, the crop divider assemblies **114*a*, 114*b* (FIG. 4) can move to a position at which the sugarcane, which can have now been cut by the cutting head 112 of the topper assembly 110, straddle a row of the cane stalks, which can then pass beneath the frame 104 and be severed from the ground by the base cutter units 118. The severed stalks can be delivered to a feed roller assembly (not shown) that transports the cane stalks to a chopper assembly 126. The chopper assembly 126 can cut the cane stalks into lengths called billets, which can then be fed into a primary extractor assembly 130. The primary extractor assembly 130 can operate to clean unwanted material, such as, for example, leaves 54 that were below the location at which the topper assembly 110 cut the crop material 50, among other crop pieces, from the billets. The billets can then pass into a loading elevator assembly 132 and to a secondary extractor assembly 134. The secondary extractor assembly 134 can act to extract further trash, including remaining portions of leaves, from the billets as the billets are conveyed from the agricultural vehicle 100** to a wagon.

FIG. 3 illustrates a simplified block diagram of an exemplary system 200 for dynamically adjusting a cutting height setting for one or more cutters of an agricultural vehicle 100. The system 200 can include one or more controllers 202 having at least one processor 204 and at least one memory device 206. The controller 202, processor(s) 204, and/or memory device(s) 206 may, or may not, be dedicated to the operation of the system 200, or components of the system 200, including the agricultural vehicle 100. For example, while, for at least purposes of simplicity of illustration, FIG. 3 depicts a controller 202 coupled to the topper control system 218, among other components of the system 200, according to certain embodiments, the controller 202 may, or may not, include a controller dedicated to a topper control system 218 that can be configured to control the positioning and operation of the topper assembly 110. Thus, for example, according to certain embodiments, the processor 204 can comprise one or more processors, including compute circuits, that can be utilized to control operation of the system 200, and, optionally, can also be utilized in connection with controlling the operation of one or more components of the agricultural vehicle 100, including, but not limited to, the height(s) of the topper assembly 110, or one or more, if not all, of the disks **113*a*, 113*b* of the topper assembly 110, among other components. Therefore, according to certain embodiments, one controller 202, including one or more processors 204 of that controller 202, can be utilized to control operation of at least the system 200, or the corresponding components of the system 200. Alternatively, a plurality of controllers 202, or combinations of processors 204, including compute circuits, can be utilized to control operation of the system 200, as well as control operations of different components of the agricultural vehicle 100. Thus, for example, while certain embodiments herein may mention functions being performed by a controller 202, including the associated processor 204**, such functions can be performed by a single controller or processor, or, alternatively, one or more functions can be performed by one or more controllers or processors, and one or more other functions can be performed by one or more other controllers or processors or combinations of controllers or processors.

The memory device 206 can have instructions stored therein that are executable by the processor 204 to cause the processor 204 to receive input, such as, for example, from one or more sensors, such as, for example, sensors 128, 209, 210, 212, 214, 222 of the below-discussed sensor system 208, a location system 216, a perception system 140, a mapping system 224, topper control system 218, steering system 230, or guidance system 232, as well as any combination thereof, among other inputs. The processor 204 can be embodied as, or otherwise include any type of processor, controller, or other compute circuit capable of performing various tasks such as compute functions and/or controlling the functions of at least the system 200. For example, the processor 204 can be embodied as a single or multi-core processor(s), a microcontroller, or other processor or processing/controlling circuit. In some embodiments, the processor 204 can be embodied as, include, or otherwise be coupled to an FPGA, an application-specific integrated circuit (ASIC), reconfigurable hardware or hardware circuitry, or other specialized hardware to facilitate performance of the functions described herein. Additionally, in some embodiments, the processor 204 can be embodied as, or otherwise include a high-power processor, an accelerator co-processor, or a storage controller.

The memory device 206 can be embodied as any type of volatile (e.g., dynamic random-access memory (DRAM), etc.) or non-volatile memory capable of storing data therein. Volatile memory can be embodied as a storage medium that requires power to maintain the state of data stored by the medium. Non-limiting examples of volatile memory can include various types of random-access memory (RAM), such as dynamic random-access memory (DRAM) or static random-access memory (SRAM). One particular type of DRAM that can be used in a memory module is synchronous dynamic random-access memory (SDRAM).

In some embodiments, the memory device 206 can be embodied as a block addressable memory, such as those based on NAND or NOR technologies. The memory device 206 can also include future generation nonvolatile devices, such as a three-dimensional crosspoint memory device (e.g., Intel 3D XPoint™ memory), or other byte addressable write-in-place nonvolatile memory devices. In some embodiments, the memory device 206 can be embodied as, or can otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base, and the conductive bridge Random Access Memory (CB-RAM), or spin transfer torque (STT) MRAM, a spintronic magnetic junction memory-based device, a magnetic tunneling junction (MTJ)-based device, a DW (Domain Wall) and SOT (Spin Orbit Transfer) based device, a thyristor based memory device, or a combination of any of the above, or other memory. The memory device 206 can refer to the die itself and/or to a packaged memory product. In some embodiments, 3D crosspoint memory (e.g., Intel 3D XPoint™ memory) can comprise a transistor-less stackable cross point architecture in which memory cells sit at the intersection of word lines and bit lines and are individually addressable, and in which bit storage is based on a change in bulk resistance.

As seen in at least FIG. 3, the agricultural vehicle 100 can include a plurality of sensors 128, 209, 210, 212, 214, 222, which, for at least purposes of discussion, can be referred to herein as being part of the sensor system 208. The below-mentioned exemplary components of the sensor system 208 can be communicatively connected to the controller 202 to communicate sensed information, including sensed data, via a wired and/or wireless connection, and from which the controller 202 can derive information.

The sensor system 208 can include a location sensor or receiver 209 that can be positioned on the agricultural vehicle 100, such as, for example, on a roof of the cab 102. Although illustrated in FIG. 3 as being part of a sensor system 208, the location sensor 209 can be part of a location system 216, such as, for example, a global positioning system (GPS) of the agricultural vehicle 100. Further, according to certain embodiments, the location sensor 209 can be utilized to connect the location system 216 to, and/or receive information from, one or more GPS satellites. Information provided by the location system 216 or the location sensor 209 can indicate a location of the agricultural vehicle 100, including, but not limited to, any or all of a longitudinal location, latitudinal location, and elevation of the agricultural vehicle 100. Further, information provided by the location system 216 or the location sensor 209 can also be used to determine a direction of travel, heading, or compass bearing, of the agricultural vehicle 100, among other information. Additionally, location information regarding the location of the location sensor 209 and/or the agricultural vehicle 100 can be used to derive locations of portions of the agricultural vehicle 100, including via use of known geometries of the agricultural vehicle 100 and corresponding positioning information relating to actuation of one or more actuators of the agricultural vehicle 100. Additionally, information provided by the perception system 140 can be used to derive corresponding location, including distance and/or depth information, that, in connection with information provided by the location system 216, be used to determine corresponding location information for features, including crop materials, in information captured by the perception system 140.

The sensor system 208 can further include a speed sensor 210 that can be utilized to identify a speed of travel of the agricultural vehicle 100, including a ground speed of the agricultural vehicle 100. For example, according to certain embodiments, the speed sensor 210 can be a radar-based speed sensor, or an IMU sensor 214, among other types of speed sensors. With respect to embodiments in which the IMU sensor 214 is utilized as a speed sensor 210, one or more accelerometers of the IMU sensor 214 can provide information regarding a measured linear acceleration of the agricultural vehicle 100, which, over a time period, can be used to determine a velocity of the agricultural vehicle 100. However, such speed information can also be attained in a variety of different manners, including using information from the location system 216, such as, for example, GPS information over or between a period of time.

The sensor system 208 can also include one or more, including a plurality, of position or height sensors 212. For example, according to certain embodiments, one or more first height sensors 212 can be utilized to identify a height of the agricultural vehicle 100, base cutters 118, or topper assembly 110, relative to the adjacent ground surface of other portions of the agricultural vehicle 100. For example, according to certain embodiments, one or more height sensors 212 can be utilized to identify a height of the agricultural vehicle 100, such as, for example, a height of the main frame 104 of the agricultural vehicle 100 relative to the adjacent ground surface, which can, according to certain embodiments, be used to determine a height of at least one or more base cutters 118. Additionally, or alternatively, one or more height sensors 212 can be utilized to determine a height of one or more base cutters 118 relative to the main frame 104 or the ground surface, including, but not limited to, a height of one or more right base cutters 118 and one or more left base cutters 118. With respect to the height of the topper assembly 110, one or more height sensors 212 can, according to certain embodiments, be used to determine the height of one or more of the disks **113*a*, 113*b* of the topper assembly 110 relative to the adjacent ground surface or the main frame 104. However, the heights of either or both the base cutters 118 and topper assembly 110, or portions thereof, can be determined in a variety of other manners, including utilizing an identified height of another component and a known geometry(ies) of the agricultural vehicle 100. For example, according to certain embodiments, the height of the topper assembly 110 can be determined based on the extension length of the cylinder 115, and moreover, the cylinder piston or rod, of the boom actuator 116. The height of the topper assembly 110 can also be determined using the known geometry of the agricultural vehicle 100 and its associated components. For example, the determination of the height of the topper assembly 110 can involve known pivot positions of the boom actuator 116 relative to the main frame 104 and/or swing frame 146, and the known extent of the extension or retraction of the cylinder 115, which can be correlated with an angular displacement of the boom 120**.

The system 200 can also include a user interface 220 that an operator can use to interact with the controller 202. The user interface 220 can include one or more input/output (I/O) devices, such as, for example, a steering wheel, joystick, button, keyboard, mouse, touch screen, display, microphone, and speaker, among other I/O devices. The user interface 220 can be utilized by the operator to input or otherwise provide a variety of information to the controller 202 that can also be stored for historical purposes, including, but not limited to, information regarding operator preferences, as discussed below.

The IMU 214 can provide information regarding at least an orientation of at least a portion of the agricultural vehicle 100. The IMU 214 can integrate a combination of accelerometers, gyroscopes, and potentially magnetometers to provide information that can be utilized by the controller 202 to determine the dynamic position and movement characteristics of the topper assembly 110, including with respect to a pitch, roll, and yaw of the agricultural vehicle 100, including with respect to the topper assembly 110 or portion thereof, including the cutting head 112. The IMU 214 can assist in the system 200 compensating for changes in terrain and movement of the agricultural vehicle 100, ensuring accurate positional adjustments during operation, thereby enhancing the accuracy of the positioning of the topper assembly 110.

The system 200 can further include a perception system 140 having a plurality of perception sensors 128*a*, 128*b*, 128*c*. A variety of different types of sensors can be utilized for the perception sensors 128*a*, 128*b*, 128*c*. Examples of such perception sensors 128*a*, 128*b*, 128*c* can include, but are not limited to, mono cameras, stereo cameras, stereo depth cameras, stereo sensors, RGBD (red, green, blue, depth) cameras, three-dimensional sensors, LIDAR, radar, and three-dimensional cameras, as well as various combinations thereof, among other types of perception sensors. The perception sensors 128*a*, 128*b*, 128*c* can also include an optical camera(s), such as, but not limited to, a panoramic camera(s), that can obtain one or more images, including still images, photographs, or video.

Figure 7:
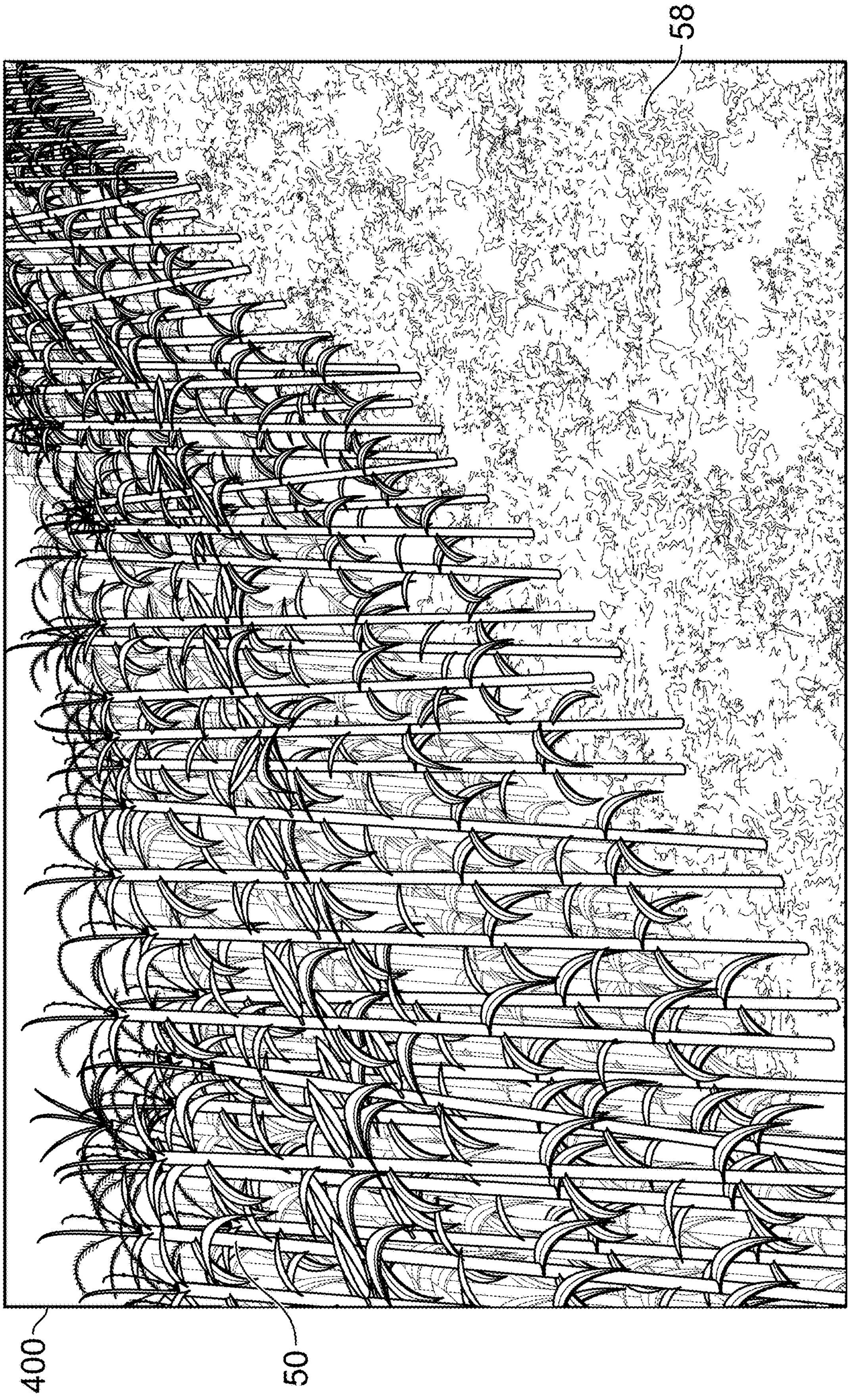
FIG. 7 illustrates an exemplary representation of a frame or image captured by a rearwardly directed perception sensor of the agricultural vehicle shown in FIG. 1.

The perception sensors 128*a*, 128*b*, 128*c* can be configured and positioned to capture information of an area that is both behind and laterally offset to the side of the agricultural vehicle 100. Moreover, the perception sensors 128*a*, 128*b*, 128*c* can be oriented to capture information of crop material 50 that is both rearwardly and offset to a right or left side of the agricultural vehicle 100. Such positioning can allow the perception sensors 128*a*, 128*b*, 128*c* to capture information regarding materials 50 in another row of crop materials 50 that the agricultural vehicle 100 will be harvesting during a next, or subsequent, pass through the corresponding field. Such positioning of the perception sensors 128*a*, 128*b*, 128*c* can accommodate the timely gathering and processing of information relating to at least characteristics of the crop material 50, including height-related information, and corresponding adjust(s) to the cutting height settings of cutter assembly(ies) based on that processed information before the agricultural vehicle 100 reaches and harvests those crop materials 50. An example of a frame of an image of such captured information is provided in FIG. 7.

Figure 6:
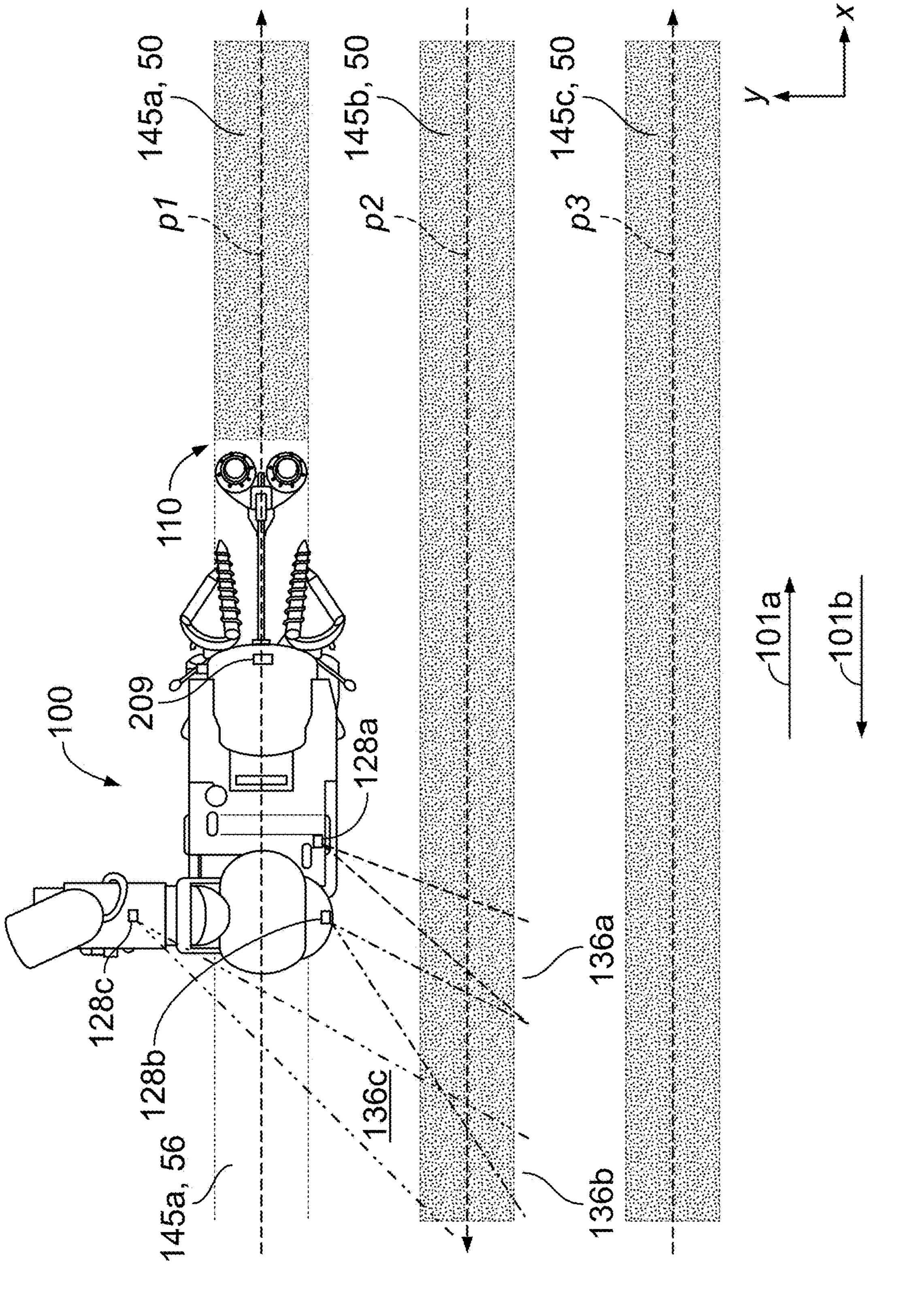
FIG. 6 illustrates a simplified representation of an agricultural vehicle having a location system and a plurality of rearwardly directed perception sensors for capturing information used to determine cutting height settings for a subsequent pass of the agricultural vehicle along a collection of crop materials.

As seen in FIGS. 4 and 6, according to certain embodiments, the agricultural vehicle 100 can have a plurality of rearwardly directed perception sensors 128*a*, 128*b*, 128*c*. More specifically, in the illustrated exemplary embodiment, the agricultural vehicle 100 incorporates a first perception sensor 128*a*, a second perception sensor 128*b*, and a third perception sensor 128*c*. These perception sensors 128*a*, 128*b*, 128*c* can capture, during sequential row harvesting, visual information of crop material 50 located in one or more adjacent rows of crop material 50 that are both rearwardly, or behind, as well as offset to the side of, the agricultural vehicle 100 and/or of the row(s) of crop material 50 through which the agricultural vehicle 100 is currently traveling and/or harvesting. As discussed below, information captured using perception sensors 128*a*, 128*b*, 128*c* of crop material 50 in other rows can facilitate system 200 having sufficient time to determine crop height and other field characteristics relating to the crop material 50 that the agricultural vehicle 100 will later encounter during another, or different, pass through the field, as well have time to implement associated adjustments to the settings of one or more cutter assemblies based on those determinations.

According to certain embodiments, the perception sensors 128*a*, 128*b*, 128*c* can be positioned such that a field of view 136*a*, 136*b*, 136*c* for each perception sensor 128*a*, 128*b*, 128*c*, respectively, at least partially overlaps with the field of view 136*a*, 136*b*, 136*c* of another perception sensor 128*a*, 128*b*, 128*c*. Thus, for example, as seen in FIG. 3, the field of view 136*b* of the second perception sensor 128*b*, as illustrated as being generally defined by a second pair of boundary lines 138*b*, can generally overlap, at least at one side of the field of view 136*b*, with the field of view 136*a* of the first perception sensor 128*a*, as generally illustrated by a first pair of boundary lines 138*a*. Similarly, another side of the field of view 136*b* of the second perception sensor 128*b* can generally overlap with the field of view 136*c* of the third perception sensor 128*c*, as generally illustrated by a third pair of boundary lines 138*c*. These overlapping fields of view 136*a*, 136*b*, 136*c* can enable the perception sensors 128*a*, 128*b*, 128*c* to capture information across different sections of the row(as) of crop material 50. Further, such an arrangement of the perception sensors 128*a*, 128*b*, 128*c* can facilitate, by the controller 202 using the associated captured information, a layered and multidimensional understanding of the crop material 50 in an adjacent row(s), including, for example, the height, density, and spatial dynamics of the crop material 50 in the other, adjacent row(s).

In the example shown in FIGS. 1, 4, and 6, according to certain embodiments, in addition to at least partial overlapping of at least some of the fields of view 136*a*, 136*b*, 136*c* of the perception sensors 128*a*, 128*b*, 128*c*, the perception sensors 128*a*, 128*b*, 128*c* can be positioned about the agricultural vehicle 100 such that the fields of view 136*a*, 136*b*, 136*c* progress generally in at least a downstream direction of each other. Thus, for example, the first perception sensor 128*a* can be positioned at an exterior side of the agricultural vehicle 100, such as, for example, about the main frame 104, among other locations, and configured to capture information in a rearwardly side direction to mimic an image that can be seen from a rear side view of crops behind the agricultural vehicle 100. The second perception sensor 128*b* can also be placed at an exterior portion of the agricultural vehicle 100, and can be positioned to expand or supplement the field of view 136*a* provided by the first perception sensor 128*a*, offering additional rearward and lateral coverage. For example, in the illustrated example, the second perception sensor 128*b* can be positioned downstream of the first perception sensor 128*a* at or around the primary extractor assembly 130, among other locations. Similarly, the third perception sensor 128*c* can be positioned to expand or supplement the field of view 136*b* provided by the second perception sensor 128*a* in a generally downstream direction. In the illustrated embodiment, the third perception sensor 128*c* can be positioned on, or about, the loading elevator assembly 132 or other portion of the agricultural vehicle 100, including an auger or conveyor housing, used in the conveyance of crop material to the secondary extractor assembly 134.

The system 200 can also include an elevation sensor 222, such as, for example, an altimeter, that can provide information regarding the terrain upon which the agricultural vehicle 100 is traveling. Alternatively, elevation information can be provided by one or more terrain maps utilized by the controller 202 of the system 200. According to certain embodiments, the controller 202 can associate the elevation information provided by the elevation sensor 222 with the corresponding latitude and longitude location information, as provided via use of the location system 216. Additionally, or alternatively, the controller 202 can command the elevation sensor 222 to obtain elevation information at a variety of locations while the location system 216 is used to detect the corresponding latitude and longitude for those locations. The controller 202 can facilitate the recording of such elevation and location information in connection with mapping cutter heights, as discussed below.

The system 200 can also include a mapping system 224 that can include logic for generating a variety of different types of maps. For example, according to certain embodiments, the mapping system 224 can be configured to generate one or more maps relating to determined crop height (s), settings relating to cutting height(s) for one or more cutters of the agricultural vehicle 100, three-dimensional crop maps, terrain elevation maps, terrain maps, maps indicating starting/ending points of crop rows, and/or coverage maps, as well as various combinations thereof, among other types of maps. The information provided by such maps can include the corresponding location information, as may be derived using information from the location system 216.

The system 200 can further include a communication device 226 that can communicate information to, as well as receive information from, one or more remote users, systems, databases, aerial imaging devices, or other agricultural vehicles, as generally collectively indicated in FIG. 3 by database 302. The communication device 226 can be embodied as hardware, firmware, software, virtualized hardware, emulated architecture, and/or a combination thereof, and can, for example, be configured for communications at least via a network 300, including, for example, via internet, cellular, or Wi-Fi networks, as well as combinations thereof. According to certain embodiments, the communication device 226 can comprise a transceiver that is configured to wirelessly communicate information, as well as receive information, that can pertain to, or assist, the controller 202 in determining or identifying crop material 50, field, and/or terrain features, including terrain features relating to topography, such as, for example, elevation of the terrain.

The system 200 can also include one or more steering systems 230, including, for example, a front steering system and/or a rear steering system. The controller 202, a guidance system 232, or a dedicated steering controller, can provide commands for controlling the steering system(s). For example, the controller 202 can generate signals to operate one or more electric motors and/or actuators, or control the flow of a steering fluid, that are utilized to control the turning and/or orientation of the associated engagement bodies 108*a*, 108*b* and/or an associated front or rear axle of the agricultural vehicle 100.

The system 200 can further include the guidance system 232, which can guide a direction(s) of travel of the agricultural vehicle 100, including using navigation paths generated by the guidance system 232. For example, according to certain embodiments, the guidance system 232 can be the AutoTrac™ system from John Deere.

Figure 5:
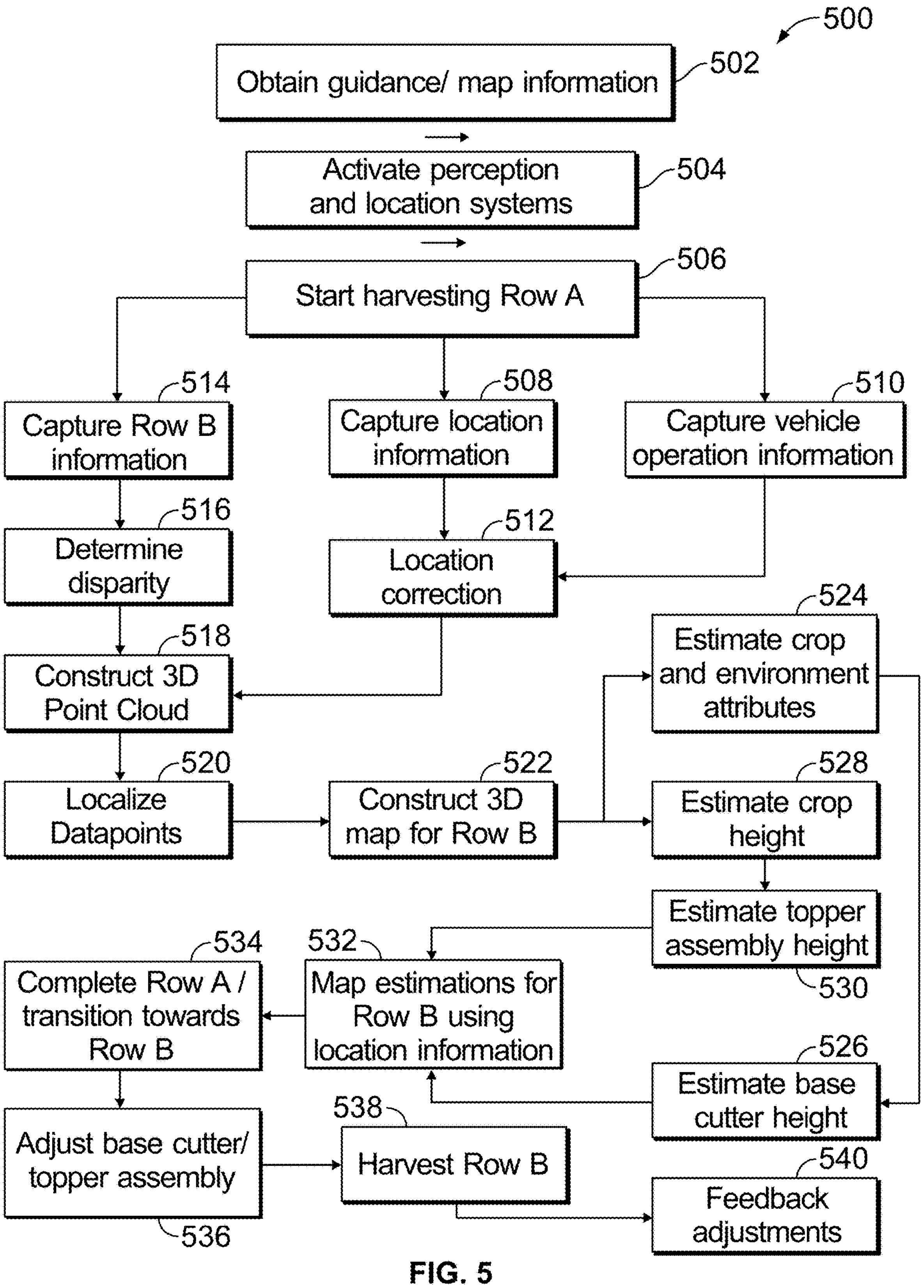
FIG. 5 illustrates a simplified flow diagram of an exemplary method for determining cutting height settings for one or more cutter assemblies of an agricultural vehicle.

FIG. 5 illustrates a simplified flow diagram of an exemplary method 500 for determining cutting height settings for one or more cutter assemblies of an agricultural vehicle 100. The method 500 is described below in the context of being carried out by the illustrated exemplary system 200, and, moreover, with respect to adjusting a cutting height of either or both the base cutters 118 and the topper assembly 110. However, it should be appreciated that method 500 can likewise be carried out by any of the other described implementations, as well as variations thereof. Further, the method 500 corresponds to, or is otherwise associated with, performance of the blocks described below in the illustrative sequence of FIG. 5. It should be appreciated, however, that the method 500 can be performed in one or more sequences different from the illustrative sequence. Additionally, one or more of the blocks mentioned below may not be performed, and the method 500 can include steps or processes other than those discussed below.

At block 502, the method 500 can include the controller 202 obtaining guidance and/or map information. The information obtained at block 502 can include, for example, either or both information stored at the agricultural vehicle 100 and/or obtained from the database 302. Such guidance or map information can include information the guidance system 232 will use to derive navigational data, including path guidance protocol used for row-tracking functionality for the agricultural vehicle 100 during sequential row harvesting. According to certain embodiments, the information obtained at block 502 can be utilized by the guidance system 232 in connection with operation of AutoTrac™, or other similar technology, to maintain alignment and minimize deviations in the travel of the agricultural vehicle 100 so as to at least assist in optimal cutter positioning and maintaining efficacy in the multi-pass operations.

According to certain embodiments, using at least the information obtained at block 502, the guidance system 232 can be configured to automatically determine the number of passes the agricultural vehicle 100 will need to take through the field to harvest the crop material 50 within the field. Additionally, the guidance system 232 can provide instructions indicating the direction of travel of the agricultural vehicle 100 for each of those passes in the field, as well as input used to control the operations of the steering system 230 and the speed of travel of the agricultural vehicle 100. Further, at block 504, to the extent not already activated, either or both of the perception system 140 and the location system 216 can be activated.

At block 506, the agricultural vehicle 100 can harvest one or more rows, as generally indicated in FIG. 5 as "Row A". For example, referencing FIG. 6, at block 506, the agricultural vehicle 100 can, during a first pass (as generally indicated by "$p_1$" in FIG. 6) in the field, begin traveling in a first direction 101*a* while harvesting crop material 50 along a Row A, which, in this example, is one or more first rows 145*a* of crop material 50. In the illustrated example, such harvesting can include a cutter assembly in the form of the topper assembly 110 cutting a second portion, such as, for example leaves 54 from a first portion, such as, for example, stalk 52 of the crop material 50 of the first row 145*a*. Additionally, or alternatively, such harvesting can include a second cutter assembly in the form of one or more base cutters 118 also being operated to sever the first portion (e.g., stalk 52) of the crop material 50 within the first row 145*a* from the adjacent ground.

At block 508, the location system 216 can provide location information that the system 200 can use to identify the location(s) of corresponding information captured by the perception system 140 (block 514) as the agricultural vehicle 100 progresses along the first row 145*a*. This process can, for example, involve utilizing the location system 216, which can include a GPS or other satellite-based guidance technology, to record precise longitudinal and latitudinal coordinates, among other types of location information, of at least the agricultural vehicle 100 as the agricultural vehicle 100 travels along the first row 145*a*. As previously discussed, such location information, which can be recorded by the memory device 206, can enable a determination of the associated location of the agricultural vehicle 100 relative to the field, and, moreover, crop materials 50 within the field as information for those particular crop materials 50 are being captured by the perception sensors 128*a*, 128*b*, 128*c*. Moreover, collection of such location information can be used to align captured information from the perception sensors 128*a*, 128*b*, 128*c* with specific field locations, including locations along other rows 145*b*, 145*c* in which, during other passes of the agricultural vehicle 100, those crop materials 50 will be cut by one or more cutter assemblies. The coordination of such information can thus aid in the ability of the system 200 to adjust the operational parameters of the agricultural vehicle 100 dynamically, based on predetermined path guidance and environmental variations detected in the corresponding specific portions of the rows 145*b*, 145*c* of the field.

At block 510, vehicle operation information, including certain operational parameters of the agricultural vehicle 100, can be captured, including recorded by the memory device 206. This operation information can involve a collection of information pertaining to the speed, steering, and/or positional dynamics of the agricultural vehicle 100 during its current pass ($p_1$) in the field, which in this example can include, for example, while harvesting crop material 50 along Row A (e.g., the first row 145*a*). For example, the speed sensor 210, as part of the sensor system 208, can provide real-time measurements of the travel speed of the agricultural vehicle 100, while directional, positional, and/or orientation adjustments of the agricultural vehicle 100, as provided, including measured, by one or more of the steering system 230 and the IMU 214, can be recorded while the agricultural vehicle is traveling along Row A.

The controller 202 can utilize information captured during blocks 508 and 510 to, at block 512, perform location correction for the agricultural vehicle 100. Such correction can involve the controller 202 seeking to ensure alignment between the location information, such as, for example, GPS information, captured at block 508, with the steering and speed of the agricultural vehicle 100, such as that obtained at block 512. In the presence of discrepancies or large margins, the system 200 can detect offsets or issues with the GPS information, which can necessitate correction or direct adjustment via use of the information from at least block 510, which the controller 202 can undertake to address these disparities.

At block 514, during this first pass ($p_1$) in the field during which the agricultural vehicle 100 is harvesting crop material 50 in the first row 145*a* (e.g., Row A), the perception system 140, and, more specifically, the perception sensors 128*a*, 128*b*, 128*c*, can capture information regarding one or more second, or other rows 145*b* (FIG. 6), generally referred to in FIG. 5 as "Row B," that is/are different from the row(s) 145*a* in which the agricultural vehicle 100 is currently harvesting crop materials 50. For instance, in the example shown in FIG. 6, the fields of view 136*a*, 136*b*, 136*c* of the perception sensors 128*a*, 128*b*, 128*c* can be seen capturing information regarding crop material 50 present in one or more adjacent second rows 145*b* that is/are laterally offset to the side of, and behind, the portion of the first row 145*a* from which the agricultural vehicle 100 is currently harvesting crop material 50.

At block 516, the captured information obtained by the perception sensors 128*a*, 128*b*, 128*c*, such as images, image frames, photographs, videos, or video segments, or combinations thereof, among other information, can be utilized by the controller 202 to create a disparity map. The disparity map can be developed by determining the difference between either two images or two positions captured by the perception sensors 128*a*, 128*b*, 128*c*, such as from monochrome cameras. The process can entail matching pixels across the images acquired from a perception sensor 128*a*, 128*b*, 128*c* with corresponding pixels in other images from one or more other perception sensors 128*a*, 128*b*, 128*c*. The distance between each pair of matching pixels can be calculated, such as, for example, by the controller 202. Such distance information can be used to create the disparity map, which can represent these distance values as intensity measurements. The derivation of these distances between matching pixel pairs across different images can form a foundation for generating the disparity map.

At block 518, the controller 202 can interpret the disparity map derived at block 516 to generate a three-dimensional point cloud representation of the corresponding agricultural environment. The process of generating the point cloud can involve interpreting the disparity map formed by the perception sensors 128 to determine distances and depth information of the field and crop material 50 present therein.

The generated point cloud can serve as a structured collection of data points in a spatial coordinate system, representing the detailed topography and crop height within the field. Each point within the point cloud can correlate to specific measurements of the agricultural environment, including structural features of the crop material 50 such as height and density, and terrain conditions. The point cloud can be utilized by the mapping system 224 in conjunction with the information obtained from the sensor system 208, including GPS information provided by the location system 216, to create comprehensive three-dimensional maps of the field environment.

At block 520, the controller 202 can localize points with respect to objects in a sequence of frames. For example, a first frame or image of crop material 50 in the second row 145*b* can be captured by one or more perception sensors 128*a*, 128*b*, 128*c* when agricultural vehicle 100 is at a first location, as shown, for example, by FIG. 7. As the agricultural vehicle 100 continues moving along the first row 145*a*, the next, or second frame or image captured by one or more of the perception sensors 128*a*, 128*b*, 128*c* can include some of the same portion(s) of crop material 50 from the second row 145*b* captured in the first frame, albeit in a different location, as well include other crop material 50 from another portion of the second row 145*b* that was not captured in the first frame. Thus, at block 520, the controller 202 can utilize an object detection technique, among other techniques, to localize features, including portions of crop material 50 from the second row 145*b*, that are observed in different locations in two or more frames or images that are captured by one or more of perception sensors 128*a*, 128*b*, 128*c*.

The disparity map generated at block 516, the three-dimensional point cloud generated at block 518, and/or the localized information from block 520, among other information, can, at block 522, be used by the controller 202 to generate a three-dimensional (3D) map for the second row 145*b*. The three-dimensional map for the second row 145*b*, as captured by the perception sensors 128*a*, 128*b*, 128*c*, can not only reconstruct the features of collections of crop materials 50 in the second row 145*b*, but will also include the corresponding locations, as indicated by the location information from block 508 and/or as corrected at block 512. Additionally, according to embodiments in which the perception sensors 128*a*, 128*b*, 128*c* are red-green-blue (RGB) cameras, the generated three-dimensional map can include, or be used to derive, locational information regarding different elements or portions of crop material 50. For example, RGB values based on different colors of crop elements can be used to distinguish portions of crop material 50 in the three-dimensional map that correspond to stalk 52 from portions of the crop material 50 that corresponds to leaves 54. The mapping system 224, for example, can integrate these findings to generate a more accurate three-dimensional representation of the field, indicating not just the height of the crop material 50, but also the topographical features and elevation changes. By producing this comprehensive three-dimensional map, the system 200 can facilitate more precise control of the height adjustments required for optimal cutting by evaluating the field's environmental conditions, thereby contributing to effective field management and crop harvesting strategies.

At block 524, the controller 202 can use the three-dimensional map for the second row 145*b* generated at block 522 to determine, including estimate, the ground height and other environmental attributes along the various locations, as identifiable from corresponding captured location information, for the second row 145*b*. This estimation process can involve, for example, evaluating along the different identified locations of the second row(s) 145*b*, locations at which the crop material 50 relative to the ground is to be severed, including at a base of the crop material 50, including at a lower portion of the stalk 52. Additionally, such information can be used to evaluate environmental attributes, including, for example, a density of the collection of crop materials 50 along various portions of the second row(s) 145*b*.

At block 526, the controller 202 can utilize at least the crop estimates determined at block 524 to determine the cutting heights at which one or more base cutters 118 are to be set for different locations along the second row 145*b*. These determinations can involve analyzing the three-dimensional map information established for the second row 145*b*, which includes details about the ground height and environmental characteristics of the crop material 50 at different identified locations along the second row 145*b*. By evaluating such information, the controller 202 can calculate precise cutting height settings for the base cutters 118. These base cutter 118 height settings can be varied for different identified locations along the second row 145*b* to accommodate for variations in the crop material 50 and/or ground, including, for example, one or more of a crop density and a terrain elevation, along the second row 145*b*.

The three-dimensional map generated at block 522 can also be utilized by the controller 202, at block 528, to determine, including estimate, features regarding crop height, such as, for example, locations of separation or transition between first and second portions of crop materials 50, including between leaves 54 and stalk 52. Such differentiation between the first and second portions of the crop material 50 at various identified locations along second row 145*b* can be determined, including identified, in a variety of different manners, including, for example, through use of RGB information provided by one or more of the perception sensors 128*a*, 128*b*, 128*c*. Using such estimated crop material 50 information for different locations along the second row 145*b*, including identified transition or separation locations along the crop materials 50 in the second row 145*b*, the controller 202 can, at block 530 determine corresponding cutting height settings for the topper assembly 110 along the different portions of the second row 145*b*. Such cutting height settings for the topper assembly 110 can include adjustments in the cutting height settings at different identified locations along the second row 145*b* to correspond to variations in the crop materials 50 at those locations.

In view of the determinations made at least at blocks 524, 526, 528, 530, the controller 202 can, at block 532, map, in a location dependent manner, the cutting height settings, including adjustments to those cutter assembly(ies) height settings, that are to be made when the agricultural vehicle 100 is harvesting crop in the second row 145*b*. Such mapping of the cutting height settings for the cutter assembly(ies) for the second row 145*b* can be made before the agricultural vehicle 100 is harvesting crop material 50 in the second row 145*b*. For example, such determinations can be completed before, or during, a transition of the agricultural vehicle 100 from harvesting crop material 50 in the first row 145*a* to harvesting crop material 50 in the second row 145*b*. Moreover, such mapping at block 532 can be completed before, or while, the agricultural vehicle 100 transitions from traveling in the first direction 101*a* associated with the first pass ($p_1$) in the field along the first row 145*a* to traveling in another, second direction 101*b* along which the agricultural vehicle 100 will be traveling during a second pass (as generally indicated by "$p_2$" in FIG. 6) while harvesting crop material 50 in the second row 145*b*. The mapping at block 532 can include height settings, and changes to the height settings, for the cutter assembly(ies) in a location dependent manner such that the corresponding locations for those settings, or setting adjustments, are pre-determined using at least location information derived from one or more of at least block 508 and/or block 512.

The generation of the map at block 532 can, according to certain embodiments, utilize Simultaneous Localization and Mapping (SLAM) techniques, among others, in which the system 200 implements an integrated approach combining perception information and sensor information. The SLAM approach can enable the agricultural vehicle 100 to construct a detailed three-dimensional map by continuously capturing perception information as the agricultural vehicle 100 travels through the field, specifically when harvesting crop material 50.

For example, as the agricultural vehicle 100 travels along the first row 145*a*, the perception system 140, including the perception sensors 128*a*, 128*b*, 128*c*, can capture sequential information pertaining to a rearward portion of at least the second row 145*b*, as discussed above with respect to at least block 508. The SLAM approach can facilitate the processing of the information captured by the perception sensors 128, 128*b*, 128*c* by employing sensor fusion techniques that may integrate location information from the location system 216 (e.g., block 508 and/or block 512), and dynamic position information (e.g., block 510), such as, for example speed or orientation and acceleration from the speed sensor 210 and/or IMU 214, respectively. This comprehensive collection of information can provide a continuous update to the crop material 50 characteristics, and corresponding location, for at least the second row 145*b*. Further, the controller 202 can utilize algorithms to continuously determine the relative motion of the vehicle 100, correlating acquired sensor information with visual features detected in captured images.

The SLAM technique can also facilitate the synthesizing of this correlated information to identify and map features such as crop height, terrain topography and spatial distribution of crop material 50, as discussed, for example, with respect to at least blocks 524, 526, 528, and 530, thereby facilitating the construct of a map, at block 532, that can reflect the three-dimensional characteristics. The system 200 can further track the movement of the agricultural vehicle 100 and update the generated map iteratively as new information is processed. Thus, the map generated at block 532 can align the features of the agricultural environment, including of the crop material 50 represented in the information captured by the perception sensors 128*a*, 128*b*, 128*c*, with specific coordinates, facilitating precise referencing of spatial dynamics and accommodating dynamic height setting adjustments for the topper assembly 110 and base cutters 118 during harvesting operations.

At block 534, the agricultural vehicle 100 can complete harvesting crop material 50 along the first row 145*a* during the first pass ($p_1$) and transition to harvesting crop material 50 along the second row 145*b* during a second pass ($p_2$) while traveling along the second direction 101*b*. In view of this transition, the controller 202 can, at block 536, generate one or more signals to facilitate, if necessary, an adjustment in the cutting height setting of one or more of the cutter assemblies (e.g., base cutters 118 and/or topper assembly 110) based on the settings mapped at block 532. Thus, the adjustment(s) at block 536 can, at least initially, be based on determinations made for the portions of the crop material 50 in the second row 145*b* that the agricultural vehicle 100 will at least initially encounter, and be subsequently adjusted, if necessary, to adjust to changes in the crop material 50 attributes at different, pre-identified locations along the second row 145*b*. Further, in certain instances, the determined cutting height settings can result in one of cutter assemblies (e.g., the base cutters 118) being adjusted, if at all, independent of any adjustment to the cutting height setting of another cutter assembly (e.g., topper assembly 110), and vice versa.

With the cutting height settings of the one or more cutter assemblies (e.g., base cutters 118 and/or topper assembly 110) adjusted at block 536, the agricultural vehicle 100 can proceed with harvesting crop material 50 in the second row 145*b*. Again, using the location information provided by at least the information from block 532, as the agricultural vehicle 100 travels along the second row 145*b*, the heights of one or more of the cutter assembly(ies) (e.g., base cutters 118 and/or topper assembly 110) can be adjusted based on the predetermined cutting heights from at least block 532. For example, according to certain embodiments, as the agricultural vehicle 100 is travelling along the second row 145*b*, the guidance system 232, such as, for example, AutoTrac™, and/or the location system 216, can provide an indication to the controller 202 of the particular location, including coordinates, at which the agricultural vehicle 100 is presently at, or is approaching, including approaching relative to the location at which the cutting height setting is, as predetermined, to be changed. Using this information, the controller 202 can identify, such as, for example, from the information determined at block 532, that a cutting height setting for one or more of the cutter assemblies is to be adjusted. Such an embodiment can also be configured such that the identification of the current, or approaching, location of the agricultural vehicle 100, including relative to portions of the crop material 50 at which the cutting height setting is to change, is identified with sufficient time to compensate for potential inherent system latencies in adjusting the cutting height settings so that the cutter assembly(ies) are timely adjusted. Thus, for example, when the agricultural vehicle 100 is determined to be within a trigger distance of a location at which the current cutting height setting is to be adjusted to a pre-determined cutting height setting, the controller 202 can generate one or more signals to commence an adjustment in the cutting height of the cutter assembly.

As the agricultural vehicle 100 is harvesting crop material 50 along the second row 145*b* (e.g., during the second pass ($p_2$)), at block 538, the system 200 can incorporate one or more feedback systems to adjust and refine the cutting height settings of the cutter assemblies, such as the topper assembly 110 and base cutters 118. The feedback system can utilize real-time information captured by other portions of the perception system 140, among other sensors of the sensor system 208, as the agricultural vehicle 100 progresses along the second row 145*b* to analyze features regarding the crop material 50 harvested by the agricultural vehicle 100, including information regarding where the crop material 50 was, or was not, cut or severed. Such feedback information can continually be analyzed by the controller 202 to dynamically fine-tune cutter height settings, including alter implemented and/or upcoming adjustments to the cutting height settings.

Additionally, at block 540, the controller 202 can analyze identified discrepancies, if any, between pre-mapped settings and real-time environmental conditions assessed during the second pass ($p_2$). Such adjustments can be made to match the operation of one or more of the cutter assemblies with actual field conditions, thereby possibly further compensating for variations in crop attributes, including density, and topographical changes, among other variations. This iterative feedback process can also leverage historical information stored in the memory device 206, enabling the agricultural vehicle 100 to learn from previous operations and apply those insights to current cutting height settings.

By refining the cutting height settings of the cutter assemblies in real time, the system 200 can enhance precision in cutting operations, thereby reducing potential crop damage and optimizing harvesting efficiency. The feedback system can also further reduce reliance on operator input and mitigate the influences of unforeseen terrain challenges or crop variations. The use of feedback adjustments at block 538 contributes to improved consistency in the harvesting process, promoting a streamlined and effective operation.

As the method 500 is an iterative process, while the agricultural vehicle 100 is harvesting crop material 50 during the second pass ($p_2$), and, moreover, along the second row 145*b*, the method 500 can be repeated for another row 145*c*, such as, for example, an adjacent third row 145*c*, as shown in FIG. 6, as well for other rows in the field. Thus, such a process can again accommodate localizing and mapping at least the next, or third, row 145*c* of crop materials 50. Thus, similar to the above discussion regarding mapping cutter assembly settings for a second row 145*b* while the agricultural vehicle 100 is harvesting crop material 50 in a first row 145*a*, prior to the agricultural vehicle 100 commencing a third pass (as generally indicated by "$p_3$" in FIG. 6), the controller 202 can, while harvesting crop in the second row 145*b*, map settings for cutting height settings in a location dependent manner for the third row 145*c*. Additionally, such a method 500 can repeatedly continue at least until the agricultural vehicle 100 is harvesting the last row of crop materials 50.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A system for an agricultural vehicle, the system comprising:
- a cutter assembly;
- a plurality of perception sensors coupled to the agricultural vehicle and positioned to capture, as the agricultural vehicle travels while harvesting a first crop material in a first row of a crop material, an information representing a second crop material when the second crop material is located rearward of the agricultural vehicle, the second crop material being located in a second row of crop material that is laterally offset from the first row of crop material;
- a location system configured to provide location information;
- at least one processor; and
- a memory device coupled to the at least one processor, the memory device including instructions that when executed by the at least one processor cause the at least one processor to:
- determine, using information from the location system, a crop location for each of a plurality of portions of the second crop material represented in the information captured by the plurality of perception sensors;
- determine, using the information captured by the plurality of perception sensors, and for each of the plurality of portions of the second crop material, a predetermined cutting height at the crop location; and
- generate, for each of the plurality of portions of the second crop material, a signal to adjust a current cutting height setting of the cutter assembly to the predetermined cutting height setting in response to (1) a detection of a location of the agricultural vehicle relative to the crop location, and (2) an identified difference between the current cutting height setting of the cutter assembly and the predetermined cutting height setting.

2. The system of claim 1, wherein the memory device further includes instructions that when executed by the at least one processor cause the at least one processor to identify, using information from the location system, the location of the agricultural vehicle relative to the crop location.

3. The system of claim 1, wherein the plurality of perception sensors are coupled to the agricultural vehicle to capture the information for each of the plurality of portions of the second crop material before the agricultural vehicle commences a harvesting of the second crop material.

4. The system of claim 1, wherein the cutter assembly is at least one of a base cutter and a topper assembly.

5. The system of claim 1, wherein the cutter assembly comprises both a base cutter and a topper assembly, and wherein the topper assembly is adjustable to the predetermined cutting height setting independent of an adjustment to the current cutting height setting of the base cutter.

6. The system of claim 1, wherein the memory device further includes instructions that when executed by the at least one processor cause the at least one processor to generate a three-dimensional map of the predetermined cutting height for each of the plurality of portions of the second crop material in a location dependent manner along the second row of crop material.

7. The system of claim 1, wherein the system further comprises an inertial measurement unit configured to provide orientation data for an identification of a dynamic positional adjustment of the agricultural vehicle while the agricultural vehicle harvests the first crop material in the first row of crop material, and wherein the memory device further includes instructions that when executed by the at least one processor cause the at least one processor to utilize a simultaneous localization and mapping approach to generate a three-dimensional map of a field based at least on a fusion of the information captured by the plurality of perception sensors, information from the location system, and information from the inertial measurement unit.

8. The system of claim 1, wherein the second row of crop material is sequentially located after the first row of crop material, and wherein the agricultural vehicle harvests the second row of crop material during a second pass through a field that occurs after the agricultural vehicle harvests the first row of crop material during a first pass through the field.

9. The system of claim 1, wherein the memory device further includes instructions that when executed by the at least one processor cause the at least one processor to:
- determine, for each of the plurality of portions of the second crop material, a separation location or a transition location between a first portion and a second portion of the second crop material;
- determine, for each of the plurality of portions of the second crop material, the predetermined cutting height setting using at least the separation location or the transition location; and
- generate a map identifying, for each of the plurality of portions of the second crop material, and in a location dependent manner, the predetermined cutting height setting.

10. The system of claim 1, wherein the memory device further includes instructions that when executed by the at least one processor cause the at least one processor to determine the predetermined cutting height setting for each of the plurality of portions of the second crop material before the agricultural vehicle commences harvesting the second crop material in the second row of crop.

11. A method for harvesting a crop material in a field by an agricultural vehicle, the method comprising:
- determining, using a captured information obtained using a plurality of perception sensors, a crop location for a plurality of portions of a second crop material in a second row of crop material while the agricultural vehicle harvests a first crop material in a first row of crop material, the captured information representing, when captured, one or more portions of the second crop material located laterally offset from, and rearward of, the agricultural vehicle;
- determining, for each of the plurality of portions of the second crop material, and using information captured by the plurality of perception sensors, a predetermined cutting height setting for a cutter assembly of the agricultural vehicle at the crop location; and
- generating, for each of the plurality of portions of the second crop material, a signal to adjust a current cutting height setting of a cutter assembly of the agricultural vehicle to the predetermined cutting height setting in response to (1) a detection of a location of the agricultural vehicle relative to the crop location, and (2) an identified difference between the current cutting height setting of the cutter assembly and the predetermined cutting height setting.

12. The method of claim 11, further comprising identifying, using information from a location system, the location of the agricultural vehicle relative to the crop location.

13. The method of claim 11, further comprising capturing the captured information of each portion of the plurality of portions of the second crop material before the agricultural vehicle commences a harvesting of the second crop material.

14. The method of claim 11, wherein the cutter assembly is at least one of a base cutter and a topper assembly.

15. The method of claim 11, wherein the cutter assembly comprises both a base cutter and a topper assembly, and further comprising adjusting a cutting height setting of the topper assembly to correspond to the predetermined cutting height setting independent of an adjusting of a current cutting height setting of the base cutter.

16. The method of claim 11, further comprising generating a three-dimensional map of the predetermined cutting height for each of the plurality of portions of the second crop material in a location dependent manner along the second row of crop material.

17. The method of claim 11, further comprising generating, using a simultaneous localization and mapping technique, a three-dimensional map of a field based at least on a fusion of the captured information from the plurality of perception sensors, information from a location system, and information from an inertial measurement unit.

18. The method of claim 11, wherein the second row of crop material is sequentially located after the first row of crop material, and further comprising adjusting the current cutting height setting in response to the detection of the location of the agricultural vehicle approaching the crop location, and the identified difference between the current cutting height setting of the cutter assembly and the predetermined cutting height setting.

19. The method of claim 11, further comprising:

determining, for each portion of the plurality of portions of the second crop material, a separation location or a transition location between a first portion and a second portion of the second crop material;

determining, for each portion of the plurality of portions of the second crop material, the predetermined cutting height setting using at least the separation location or the transition location; and generating a map identifying, for each portion of the plurality of portions of the second crop material, and in a location dependent manner, the predetermined cutting height setting.

20. The method of claim 11, further comprising determining the predetermined cutting height setting for each portion of the plurality of portions of the second crop material before the agricultural vehicle commences harvesting the second crop material in the second row of crop.

* * * * *